United States Patent
Colombo

(10) Patent No.: US 11,068,331 B2
(45) Date of Patent: Jul. 20, 2021

(54) PROCESSING SYSTEM, RELATED INTEGRATED CIRCUIT AND METHOD FOR GENERATING INTERRUPT SIGNALS BASED ON MEMORY ADDRESS

(71) Applicant: STMicroelectronics Application GMBH, Aschheim-Dornach (DE)

(72) Inventor: Roberto Colombo, Munich (DE)

(73) Assignee: STMICROELECTRONICS APPLICATION GMBH, Aschheim-Dornach (DE)

( * ) Notice: Subject to any disclaimer, the term of this patent is extended or adjusted under 35 U.S.C. 154(b) by 225 days.

(21) Appl. No.: 16/289,425

(22) Filed: Feb. 28, 2019

(65) Prior Publication Data

US 2019/0272211 A1 Sep. 5, 2019

(30) Foreign Application Priority Data

Mar. 2, 2018 (IT) .................. 102018000003233

(51) Int. Cl.
*G06F 11/00* (2006.01)
*G06F 11/07* (2006.01)
*G06F 11/10* (2006.01)

(52) U.S. Cl.
CPC ...... *G06F 11/0793* (2013.01); *G06F 11/0727* (2013.01); *G06F 11/0751* (2013.01); *G06F 11/1048* (2013.01)

(58) Field of Classification Search
CPC ............. G06F 11/0793; G06F 11/0727; G06F 11/0751; G06F 11/1048
See application file for complete search history.

(56) References Cited

U.S. PATENT DOCUMENTS

| | | | |
|---|---|---|---|
| 6,453,429 B1* | 9/2002 | Sadana | G06F 11/0745 714/43 |
| 8,108,754 B1* | 1/2012 | Tang | H03K 19/17764 714/758 |
| 8,762,797 B2* | 6/2014 | Serebryany | G06F 11/0793 714/702 |

(Continued)

OTHER PUBLICATIONS

European search report for application EP 19159273, May 13, 2019, pp. 1-5 (https://globaldossier.uspto.gov/#/details/EP/19159273/A/128423) (Year: 2019).*

*Primary Examiner* — Elmira Mehrmanesh
(74) *Attorney, Agent, or Firm* — Slater Matsil, LLP

(57) ABSTRACT

A processing system includes a processing unit configured to be connected to a memory with error detection and/or correction. The processing unit generates at least one read request for reading data from the memory, the read request including an address signal identifying an address of a given memory area in the memory. The processing system includes an error handling circuit connected to the memory for receiving an error signal containing an error code indicating whether the data read from the memory contains errors. The error handling circuit includes a hardware circuit configured to set a first error signal to the error code of the error signal when the address indicated by the address signal belongs to a first address range and to set a second error signal to the error code of the error signal when the address indicated by the address signal belongs to a second address range.

23 Claims, 6 Drawing Sheets

(56) References Cited

U.S. PATENT DOCUMENTS

| | | | | |
|---|---|---|---|---|
| 9,202,591 | B2* | 12/2015 | Solhusvik | G11C 29/08 |
| 9,495,239 | B1* | 11/2016 | Ahmad | G06F 11/142 |
| 9,583,219 | B2* | 2/2017 | Kim | G11C 17/18 |
| 10,289,498 | B2* | 5/2019 | Yoshida | G06F 11/1469 |
| 2008/0301498 | A1* | 12/2008 | Hsu | G06F 11/0793 |
| | | | | 714/23 |
| 2009/0040887 | A1* | 2/2009 | Hayashi | G11B 7/0941 |
| | | | | 369/44.11 |
| 2010/0064205 | A1 | 3/2010 | Moyer | |
| 2011/0047408 | A1 | 2/2011 | Gille et al. | |
| 2016/0266964 | A1* | 9/2016 | Uekusa | H03K 19/17764 |
| 2017/0192870 | A1* | 7/2017 | Kangas | G06F 11/2236 |

* cited by examiner

PROCESSING SYSTEM, RELATED INTEGRATED CIRCUIT AND METHOD FOR GENERATING INTERRUPT SIGNALS BASED ON MEMORY ADDRESS

CROSS-REFERENCE TO RELATED APPLICATIONS

This application claims priority to Italian Patent Application No. 102018000003233, filed on Mar. 2, 2018, which application is hereby incorporated herein by reference.

TECHNICAL FIELD

Embodiments of the present disclosure relate generally to processing systems, such as micro-controllers, associated with a memory.

BACKGROUND

FIG. 1 shows a typical electronic system, such as the electronic system of a vehicle, including a plurality of processing systems 10, such as embedded systems or integrated circuits, e.g., a Field Programmable Gate Array (FPGA), Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to the vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

FIG. 2 shows a block diagram of a typical digital processing system 10 corresponding to any of the previously mentioned processing systems $10_1$, $10_2$ and/or $10_3$, such as a micro-controller.

In the embodiment considered, the processing system to includes at least one processing unit 102 (also referred to as a processor), such as a microprocessor, usually the Central Processing Unit (CPU), programmed via software instructions.

In the example considered, the software executed by the processing unit 102 is stored in a non-volatile program memory 104a, such as a Flash memory or EEPROM. Thus, the memory 104a is configured to store the firmware for the processing unit 102, wherein the term firmware includes both the software of a micro-processor and the programming data of a programmable logic circuits, such as a FPGA. Similarly, the processing unit 102 may be associated with one or more volatile memories 104b, such as a Random-Access Memory (RAM), e.g. a Static Random-Access Memory (SRAM) or a Dynamic Random-Access Memory, e.g. for storing temporary results of the program executed by the processing unit 102. Generally, each memory 104a or 104b may be integrated with the processing unit 102 in a single integrated circuit, or the memory may be in the form of a separate integrated circuit and connected to the processing unit 102, e.g. via the traces of a printed circuit board.

In the example considered, the processing unit 102 may be associated with one or more further resources 106, such as: one or more communication interfaces, such as an Universal Asynchronous Receiver/Transmitter (UART), Serial Peripheral Interface (SPI), Inter-Integrated Circuit (I2C), Controller Area Network (CAN), Ethernet, and/or debug interface; and/or one or more analog-to-digital and/or digital-to-analog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a PWM (Pulse-Width Modulation) driver.

Future generation processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.). For example, complexity is expected to increase in particular in the context of the forthcoming Car2X and autonomous driving world, because safety and security of the processing systems to will become more and more relevant.

For this reason, the processing units to should be able to detect and/or correct errors in the data read from the memories 104a and/or 104b, thereby permitting that suitable measure are taken in order to avoid malfunctions of the system.

SUMMARY

In view of the above, various embodiments of the present disclosure to provide solutions able to improve the behavior of a processing system, such as a micro-controller, in response to an error in the data read from a memory.

According to one or more embodiments, one or more of the above objectives is achieved by a processing system having the features specifically set forth in the description that follows. Embodiments moreover concern a related integrated circuit and method.

As mentioned before, various embodiments of the present description relate to a processing system including a processing unit, such as micro-processor adapted to be programmed via software instructions.

In various embodiments, the processing unit is arranged to be connected to a memory with error detection and/or correction, wherein the processing unit generates a read request for reading data from the memory, wherein the read request includes an address signal identifying the address of a given memory area in the memory. Generally, the memory may be integrated in the processing system, e.g. in an integrated circuit, or may be connected externally to the processing system. For example, in various embodiments, the memory may be a non-volatile memory arranged to store the firmware for the processing unit and/or a Random-Access Memory arranged to store temporary results of the processing of the processing unit.

In various embodiments, the processing system includes moreover an error handling circuit. Specifically, the error handling circuit is connected to the memory for receiving an error signal from the memory. For example, the error signal may contain an error code indicating whether the data read from the memory do contain errors. For example, the error signal may include a plurality of bits, and the error code of the error signal may indicate (at least) that no error occurred during the reading operation of the data, an error occurred during the reading operation of the data, but the error was corrected, and an error occurred during the reading operation of the data and the error was not corrected.

In various embodiments, the error handling circuit is configured to generate (at least) a first error signal and a second error signal. For this purpose, the error handling circuit includes a hardware circuit configured to determine whether the address indicated by the address signal belongs to a first address range and set the first error signal to the error code of the error signal when the address indicated by the address signal belongs to the first address range. Similarly, the hardware circuit may determine whether the address indicated by the address signal belongs to a second address range and set the second error signal to the error code of the error signal when the address indicated by the address signal belongs to the second address range. In various embodiments, the first address range and/or the second address range are programmable.

For example, in various embodiments, the hardware circuit may include a first combinational logic circuit configured to set a first enable signal to a first or second logic value when the address indicated by the address signal belongs or does not belong to the first address range, respectively. Similarly, the hardware circuit may include a second combinational logic circuit configured to set a second enable signal to a first or second logic value when the address indicated by the address signal belongs or does not belong to the second address range, respectively. In various embodiments, the hardware circuit may also include a third combinational logic circuit configured to set the first error signal to the error code of the error signal when the first enable signal has the first logic value and set the second error signal to the error code of the error signal when the second enable signal has the first logic value.

In various embodiments, the error handling circuit may include moreover a register configured to store the error code of the error signal and provide the stored error code to the hardware circuit for generating the first and second error signal. Additionally or alternatively, the error handling circuit may include a register configured to store the error code of the first or second error signal.

In various embodiments, the error handling circuit is associated with an interrupt generator circuit configured to generate one or more interrupt signals when the error code of the first error signal corresponds to one or more first reference values and/or the error code of the second error signal corresponds to one or more second reference values. In various embodiments, the one or more first reference values and/or the one or more second reference values are programmable.

For example, at least one of the interrupt signals, the first error signal and the second error signal may be provided to the processing unit of the processing system. Additionally or alternatively, the processing system may include a communication interface and at least one of the interrupt signals, the first error signal and the second error signal may be provided directly to the communication interface. Additionally or alternatively, the processing system may include a pin and at least one of the interrupt signals, the first error signal and the second error signal may be provided directly to the pin.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
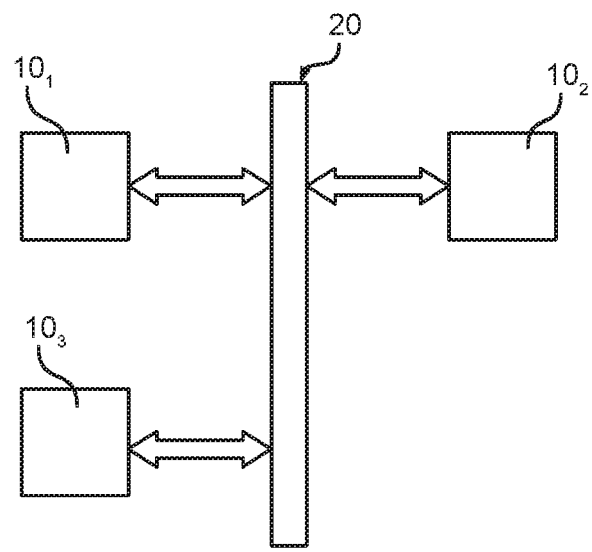
FIG. 1 shows a typical electronic system including a plurality of processing systems.
Figure 2:
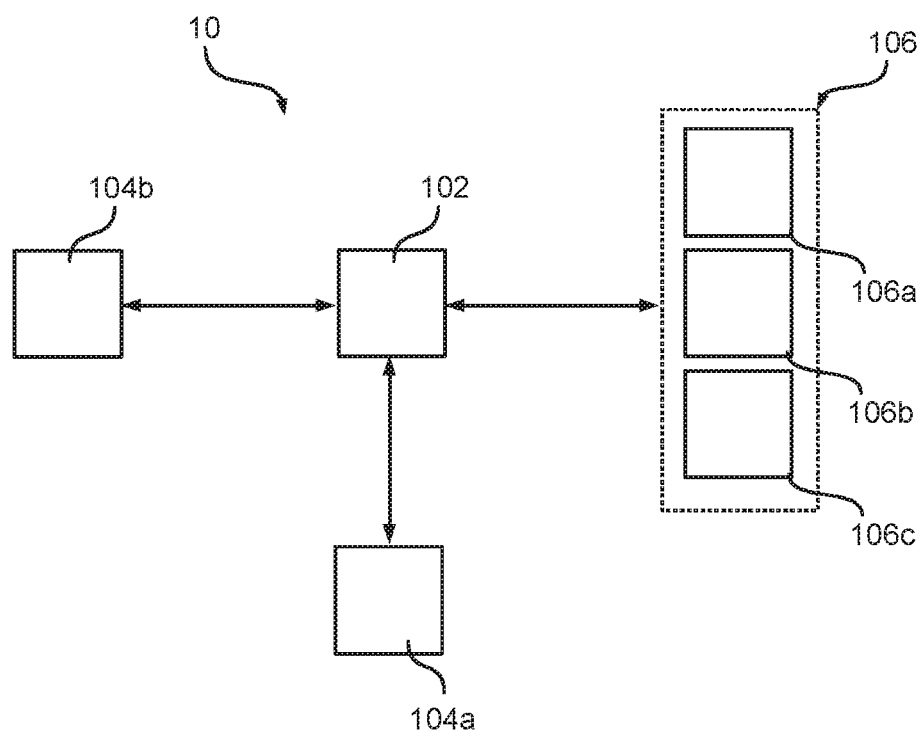
FIG. 2 shows an exemplary processing system including at least one memory and a processing unit.
Figure 3:
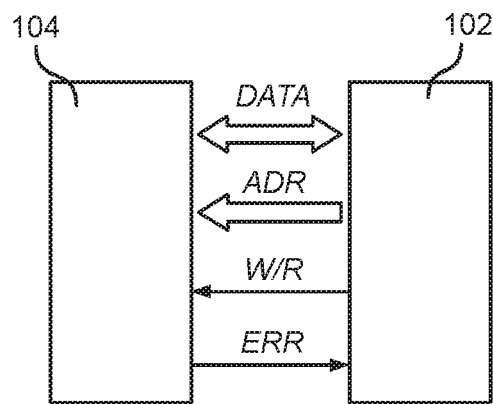
FIG. 3 shows an embodiment of the communication channel between a memory and a processing unit.

In the following FIGS. 3 to 11, parts, elements or components which have already been described with reference to FIGS. 1 and 2 are denoted by the same references previously used in such Figures; the description of such previously described elements will not be repeated in the following in order not to overburden the present detailed description.

As mentioned before, various embodiments of the present disclosure relate to solutions for managing errors in the data read from a memory 104.

FIG. 3 shows again a processing system to including a processing unit 102 and a memory 104, such as a non-volatile memory 104a or a volatile memory 104b. Accordingly the description of FIG. 2 fully applies also to the system of FIG. 3.

In the embodiment considered, the processing unit 102 is connected via a suitable communication channel to the memory 104 in order to provide an address signal ADR to the memory 104 and receive respective data DATA from the memory 104. In case of programmable memories 104 (such as volatile memories 104b or programmable non-volatile memories 104*a*), the processing unit 102 may also be configured to transmit respective data DATA for a given address ADR to the memory 104. Usually, for this purpose the processing unit 102 provides one or more control signals to the memory 104 in order to select the operation to be performed, such as a write/read control signal W/R used to select a write or read operation to be performed for a given address ADR.

Generally, the communication channel for transmitting the address signal ADR and the data signal DATA may be any suitable communication channel, including serial or parallel communication channels, bi-direction or plural unidirectional communication channels, synchronous or asynchronous communication channels. For example, in various embodiments the memory 104 includes a first number $N_{ADR}$ (e.g. 8, 16, 32, 64 bits) of input terminals for receiving the address signal ADR and a second number $N_{DATA}$ (e.g. 8, 16, 32, 64 bits) of input/output terminals for exchanging the data signal DATA. Accordingly, the first number $N_{ADR}$ defines the address space of the memory 104 and the second number $N_{DATA}$ corresponds to the length of the data exchanged with the memory 104.

In various embodiments, the memory 104 may also support an error detection and/or error correction function in order to detect and/or correct errors in the data read from the memory 104. In this case, the memory 104 may also provide one or more error signal ERR to the processing unit 102 indicating e.g. that the data contain an error and/or that an error in the data has been corrected or not.

Figure 4:
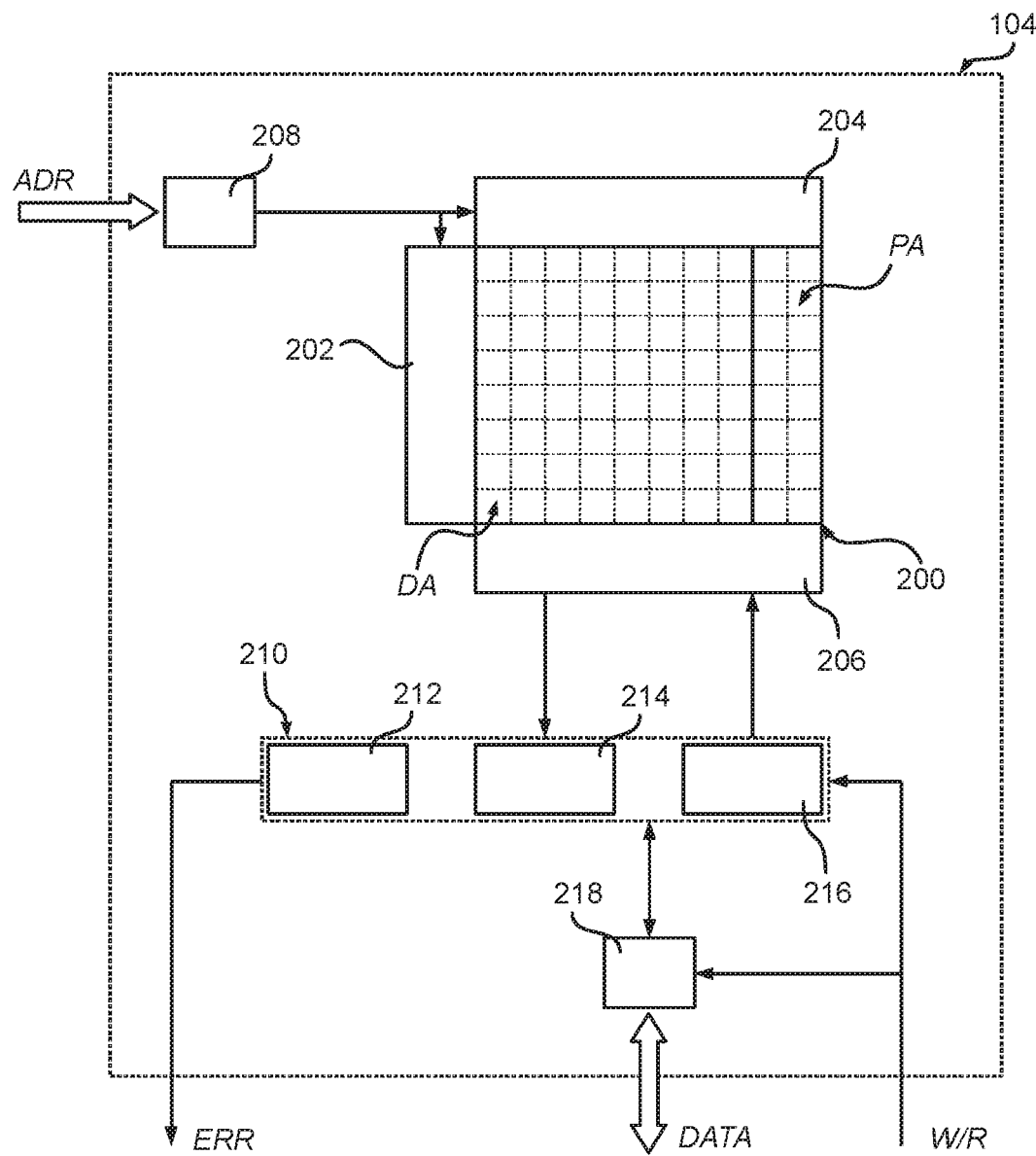
FIG. 4 shows an embodiment of a memory including an error detection and/or correction circuit.

For example, FIG. 4 shows a possible embodiment of a memory 104, such as a semiconductor memory, configured to detect and possibly correct errors in the data read from the memory. Such a memory is known e.g. from document U.S. Pat. No. 5,233,616.

Specifically, in the embodiment considered, the memory 104 includes a memory area 200 including one or more memory cells. For example, the memory cells may be arranged in a plurality of rows and optionally columns. For example, each memory cell may be a RAM or flash cell.

As mentioned before, the memory 104 receives, at an input thereof, the address signal ADR, wherein the address signal ADR is used to select a given sub-area within the memory area 200. For example, the address signal ADR may be provided to a row decoder 202 and an optional column decoder 204 in order to select a given sub-area in the memory area 200, i.e. a given number of bits $N_{MEM}$ within the memory area 200. In various embodiments, the address signal ADR may not be provided directly to the row (and column) decoder, but the address signal ADR may be stored in an address buffer 208.

As mentioned before, the memory 104 also includes one or more input and/or output terminals for exchanging the data signal DATA. Generally, also the data signal DATA may be stored in a data buffer 218.

For example, in the embodiment considered, the memory 104 supports both read and write operations, which may be selected via a control signal W/R. Specifically, in the embodiment considered, the memory area 200 is associated with a write and read interface 206. For example, the interface 206 may include a write driver in order to write data to the selected memory sub-area and a sense amplifier in order to read data from the selected memory sub-area.

In a conventional memory, the write and read interface 206 would operate directly with the data exchanged via the data signal DATA, e.g. when using a bi-directional data bus, the memory provides the data read from the selected memory sub-area having $N_{MEM}=N_{DATA}$ bits via the signal DATA or the memory stores the $N_{MEM}=N_{DATA}$ bits received via the signal DATA to the selected memory sub-area.

Conversely, in a memory 104 supporting an error detection and/or correction function, the number of bits $N_{MEM}$ of the selected memory sub-area is greater than the number of bits $N_{DATA}$ of the data signal DATA. For example, as schematically shown in FIG. 4, each sub-area of the memory area 200 may consist in a first field DA having the number of bits $N_{DATA}$ for storing data DATA and a second field PA having $N_{PA}$ bits for storing one or more additional bits, with $N_{MEM}=N_{DATA}+N_{PA}$.

In this case the memory 104 may include an error processing circuit 210 which manages the data exchange between the data signal DATA and the interface 206. Specifically, the error processing circuit 210 includes at least an encoder module 216 and a decoder module 214.

Specifically, when performing a write operation (as selected e.g. via the signal W/R), the encoder module 216 is configured to encode the data signal DATA (having $N_{DATA}$ bits) in order to generate encoded data (having $N_{MEM}$ bits) and provide the encoded data to the interface 206 in order to write the encoded data to the selected memory sub-area. For example, the encoder module 216 may calculate the error correction bits PA to be stored with the data.

Conversely, when performing a read operation (as selected e.g. via the signal W/R), the decoder module 214 is configured to decode the data of the selected memory sub-area (having $N_{MEM}$ bits) in order to generate decoded data (having $N_{DATA}$ bits) and provide the decoded data via the data signal DATA. For example, when using additional error detection bits (e.g. parity bits) PA, the decoded data may directly correspond to the field DA. However, the decoder module 214 also processes the additional bits in order to determine whether the data read from the memory area 200 contain valid data, e.g. by using the error detection bits PA. For example, in the embodiment considered, the decoder module 214 may recalculate the error detection bits for the data DA read and compare the calculated error detection bits with the bits of the field PA read from the memory. In this case, the decoder module 214 may thus generate an error signal ERR when the error detection data do not correspond. Usually, the number of error detection bits PA is correlated to the number of errors which may be detected in the data field DA.

Generally, also more complex encoding/decoding schemes may be used, e.g. in order to support not only error detection but also error correction. An overview of the difference between error detection and error correction codes may be found at "https://en.wikipedia.org/wiki/Error_detection_and_correction/".

For example, when using encoding/decoding methods permitting also an error correction, the error processing circuit 210 includes also an error correction circuit 212, which may also be combined directly with the decoder module 214. Specifically, the error correction circuit 212 is configured to reconstruct the original data written to the memory are 200 even in case of one or more errors (based on the encoding scheme used) in the data read from the selected memory sub-area, such as in the data field DA and/or the field PA.

The operation of such a memory 104 is well known in the art, e.g. in the contexts of Error-Correcting Code (ECC) memories.

In various embodiments, the error correction circuit 212 may thus generate an error signal ERR when the error correction circuit 212 is unable to correct the error in the data read from the memory.

Accordingly, in various embodiments, the error signal ERR provided by the memory 104 may signal for each read operation an error code indicating that the data read from the memory 104: 1) do not contain error; 2) contain at least one error, but the error could be corrected; possibly also indicating the number of bits which contained errors (e.g. by using different error codes); or 3) contain at least one error and the error could not be corrected.

Thus, based on the error code of the error signal ERR, the processing system 10a may perform different operations.

Figure 5:
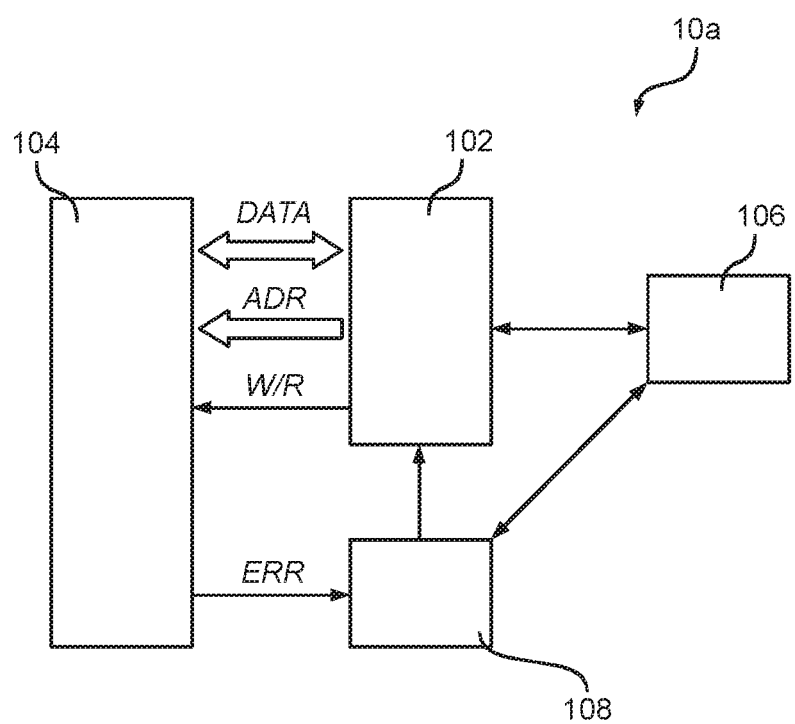
FIG. 5 shows an embodiment of a processing system including a processing unit, a memory and an error handling circuit.

For example, FIG. 5 shows an embodiment of a processing system 10a, wherein the processing unit 102 is associated with an error handling circuit 108. Specifically, in the embodiment considered, the error handling circuit 108 receives at input the one or more error signals ERR provided by the memory 104.

Figure 6:
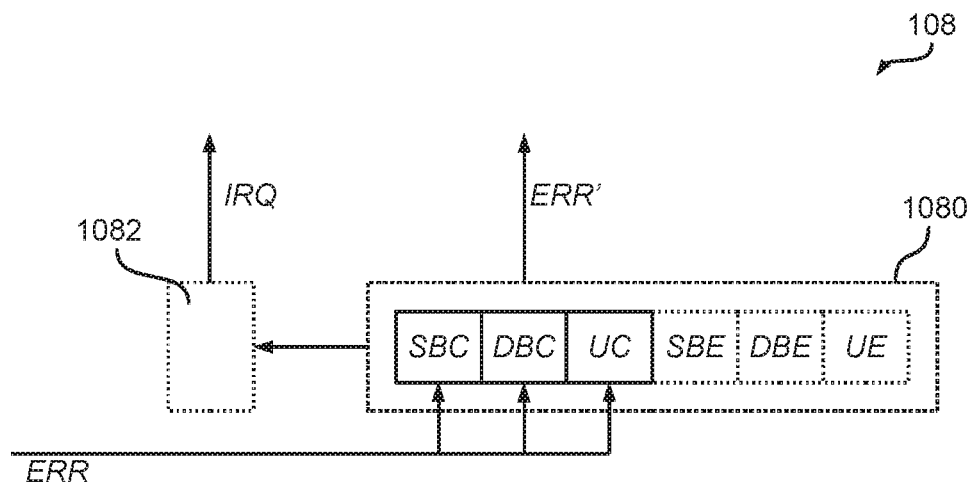
FIG. 6 shows an embodiment of the error handling circuit of FIG. 5.

For example, FIG. 6 shows a first embodiment of the error handling circuit 108.

In the embodiment considered, the error handling circuit 108 includes a register 1080 providing an error signal ERR'. Specifically, in various embodiments, the register 1080 is addressable by the processing unit 102, so called special function register. For example, in the embodiment considered, the memory 104 supports an error correction code able to correct up to two-bit errors. In this case, the error signal ERR may include three bits: a bit SBC indicating a single bit error having been corrected; a bit DBC indicating a double bit error having been corrected; and a bit UC indicating that the error was not corrected.

For example, in case all bits are low ("000"), the error signal ERR indicates that no error occurred, while a single bit is set when a memory error is signaled.

In various embodiments, the error signal ERR' has the same number of bits as the error signal ERR and the same encoding is used for the error codes, i.e. in the embodiment considered, the register includes three error bits SBC, DBC and UC. Generally, also other encoding schemes may be used for the error codes/types and the encoding of the error signal ERR provided by the memory 104 may be different from the encoding of the error signal ERR'. For example, the error signal ERR and/or the error signal ERR' may have two bits (e.g. "00" for no error, "01" for single bit error, "10" for double-bit error and "11" for uncorrected error). Accordingly, based on the encoding of the error codes of the error signal ERR, the error handling circuit 108 generally sets the error bits in the register 1080/error signal ERR' as a function of the error signal ERR.

In various embodiments, the error handling circuit 108 may also include a circuit 1082 configured to manage the internal reactions of the processing system 10a. For example, such reactions may include the generation of an (non-maskable and/or maskable/configurable) interrupt, a reset, the activation of a debug mode, etc.

For example, in the following will be described, without loss of generality, a circuit 1082 configured to operate as an interrupt generator circuit 1082 configured to generate one or more interrupts IRQ as a function of the error signal ERR'(or directly the error signal ERR). For example, in various embodiments the interrupt generator circuit 1082 is configured to generate an interrupt signal IRQ when: 1) one of the bits of the error signal ERR or ERR' is set; 2) the bit DBC is set or the bit UC is set; or 3) only the bit UC is set.

In various embodiments, the mode of operation of the interrupt generator circuit 1082 may be programmable, e.g. by setting one or more interrupt enable bits in the register 1080. For example, in various embodiments, the register 1080 includes for each error code indicating an error a respective error enable flag. For example, in the embodiment considered, the register 1080 includes three additional bits SBE, DBE and UE, which permit to specify whether the interrupt generator circuit 1082 should set the interrupt IRQ when the respective bit SBC, DBC and UC is set.

In various embodiments, the error signal ERR' and the optional interrupt IRQ are provided to the processing unit 102.

Figures 7A, 7B:
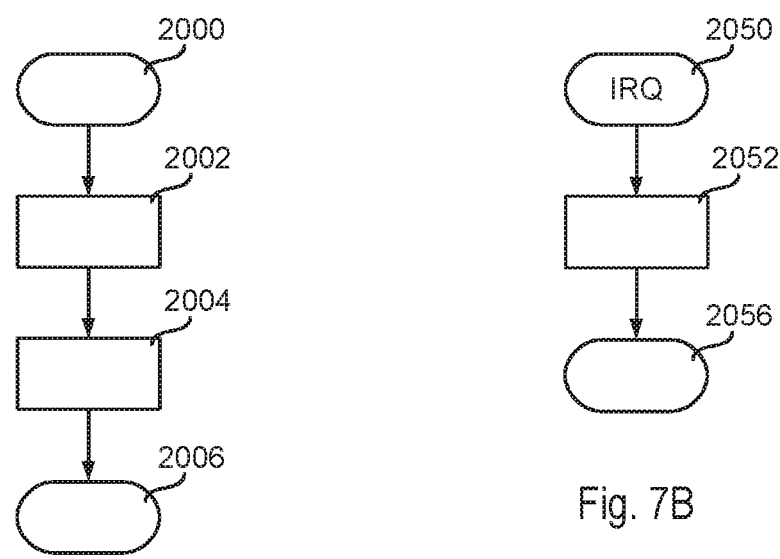
FIGS. 7A and 7B illustrate flowcharts showing an embodiment of the operation of the processing unit of FIG. 5.

For example, FIGS. 7A and 7B show an embodiment of the operation of the processing unit 102, which e.g. may be implemented by a suitable programming of a micro-processor via software code.

After a start step 2000, the processing unit 102 may enable at a step 2002 the generation of an interrupt for one or more error codes, e.g. by setting the bits SBE, DBE and UE in the register 1080, thereby selecting the desired error detection behavior. Generally, the step 2002 is purely option, because the processing unit 102 may also not re-program the respective default/reset values or the behavior of the interrupt generator circuit 1082 may be fixed.

Next the processing unit 102 may proceed to the normal operation mode 2004, i.e. execute the application, which may include one or more read (and possibly also write) accesses to the memory 104, and the procedure ends at a stop step 2006.

Once a read error is detected by the memory (see also FIG. 4), the memory 104 signals the respective error code via the error signal ERR and the interrupt generator circuit 1082 generates an interrupt IRQ when the error code corresponds to enabled error code.

In response to the generation of an interrupt IRQ at a step 2050, the processing unit 102 will thus start at a step 2052 an error handling routine, and once having executed the error handling routine the processing unit 102 returns to the normal operation at a stop step 2054 terminating the interrupt routine. For example, the processing unit 102 may read the content of the register 1080, in particular the signal ERR', at the step 2052 and select a given operation based on the type of error. For example, the processing unit 102 may not perform any operation when a single bit error is indicated. Conversely, the processing unit may monitor the number of double bit errors and provide an error message to a user when a given threshold is exceeded. Finally, the processing unit 102 may provide immediately the error message when an uncorrectable error has been detected.

For example, the method shown in FIGS. 7A and 7B may be useful in order to monitor errors in the RAM and/or non-volatile memory (e.g. Flash, PCM, etc.) of a microcontroller. For example, in this case each memory 104 may provide the respective error signal ERR to a respective error handling circuit 108. In this way the error behavior for each memory 104 may also be configured independently, e.g. by setting the respective enable flags in the respective memory 1080. Generally, such plural error handling circuit 108 may also be combined in a single error handling circuit 108, e.g. by providing respective error bits and possibly error code enable flags in the memory 1080.

Moreover, the capabilities of the memories 104a and 104b may also be different. For example, the non-volatile memory 104a may implement an error correction mechanism able to correct up to double-bit errors, while the volatile memory 104b may only be able to correct single bit errors.

In addition or as an alternative to sending the signal ERR' and/or the interrupt IRQ to the processing unit 102, the internal reaction circuit 1082 and the register 1080 may also send one or more of these signals to another block 106 of the processing unit, such as a communication interface, a reset circuit and/or a debug circuit. For example, the reset circuit may be configured to restart the processing system in a degraded mode when an uncorrectable error was detected (e.g. UC="1"). Similarly, the signal ERR' and/or the interrupt IRQ may be provided to one or more pins of the processing system 10a.

Accordingly, the solution described with respect to FIGS. 5, 6, 7A, and 7B permits to selectively choose the behavior of the processing system 10a as a function of the type of a memory read error.

However, when integrating different applications within the processing system 10a, only a single memory fault behavior may be configured for each memory 104. However, for certain applications it might be useful that a first type of applications, such as safety-critical applications, react in a different way than a second type of applications, such as non-safety critical application. For example, in various applications it may be useful that the second type of applications is only interrupted when the memory read error was not corrected, while the first type of application should already intervene when a single (or double) bit error has been detected.

For example, in the embodiment shown in FIGS. 7A and 7B, the processing unit 102 could enable at step 2002 the interrupt IRQ for any error type. In response to an error, the processing unit 102 may then determine at the error handling step 2052 the currently executed application in order to decide how to treat the error, eventually ignoring also the error. However, in case of micro-processors each memory error would thus generate an interrupt, which thus causes an interruption of the execution of the application.

Accordingly, in the following will be described an embodiment, which further improves the treatment of memory errors directly at a hardware level.

Specifically, in various embodiment, the processing system 10a is configured to generate different triggers not only based on the error type (e.g. single-bit correctable fault SBC="1", double-bit correctable fault DBC="1", or non-correctable fault UC="1"), but also based on the memory address ADR where the error occurred.

Figure 8:
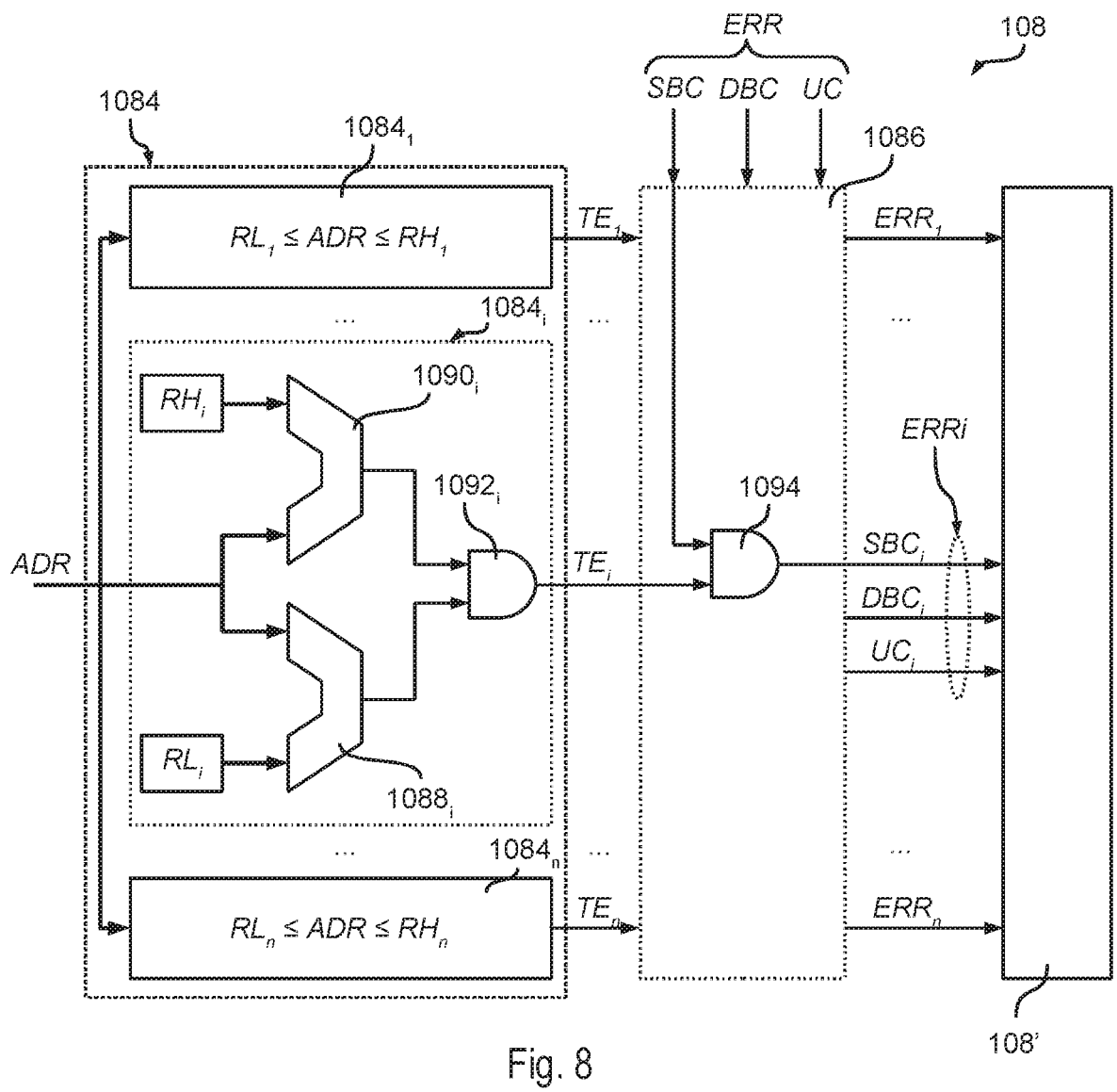
FIGS. 8 and 9 show a second embodiment of an error handling circuit.

Specifically, FIG. 8 shows an embodiment of an error handling circuit 108, which includes an error collector and an optional internal reaction circuit 108' (essentially corresponding to the circuit 108 described in the foregoing) and two additional logic circuits 1084 and 1086 associated with the circuit 108'.

Specifically, the first circuit 1084 includes a plurality of sub-blocks $1084_1, \ldots 1084_n$, wherein each block $1084_i$ (with i=1 ... n) is configured to determine whether the current address ADR belongs to a given memory address region, i.e. whether the current address ADR is between a respective lower limit $RL_i$ and upper limit $RH_i$. For example, in the embodiment considered, each bock $1084_i$ includes for this reason: a first digital comparator $1088_i$ configured to determine whether the address ADR is greater than the respective lower limit $RL_i$; a second digital comparator $1090_i$ configured to determine whether the address ADR is smaller than the respective upper limit $RH_i$; and a logic gate $1092_i$, such as an AND gate, combining the output signals of the comparators $1088_i$ and $1090_i$.

Accordingly, in the embodiment considered, each block $1084_i$ sets a respective enable signal $TE_i$ (corresponding e.g. 10 the output of the respective logic gate $1092_i$) when the address ADR belongs to a given memory address region.

In various embodiments, the limits $RL_i$ and $RH_i$ are programmable. For example, the limits may be stored in special function registers of the processing unit 102, e.g. in the register 1080, or may be set by programming a given area in the non-volatile program memory 104a of the processing unit 102.

The second circuit 1086 receives at input the error signal ERR from the memory 104 and the enable signals $TE_i$ from the block 1084. Specifically, the circuit 1086 generates then a plurality of error signals $ERR_1 \ldots ERR_n$ by combining the error signal ERR with the respective enable signal $TE_i$.

Accordingly, only the error signals $ERR_1 \ldots ERR_n$ will be set to the value of the current error signal ERR for which also the respective enable signal $TE_i$ is set. For example, considering the exemplary case where the error signal ERR includes the bits SBC, DBC and UC, also each error signal $ERR_i$ includes bits $SBC_i$, $DBC_i$ and $UC_i$. For example, assuming that the signals are set when the logic level is high, each bit of the signal $ERR_i$ may be obtained via a logic AND operation (e.g. at a logic gate 1094), i.e.:

$SBC_i$=SBC AND $TE_i$; $DBC_i$=DBC AND $TE_i$; $UC_i$=UC AND $TE_i$.

Accordingly, generally the blocks 1084 and 1086 generate a plurality of error signals $ERR_1 \ldots ERR_n$ as a function of the error signal ERR indicating a read error (and possibly the type of the error) and a respective address ADR of the read operation. Specifically, the circuit 1084 is configured to monitor the failed address ADR and, if it falls within any of the programmed memory windows, then it activates a respective enabling signal $TE_i$ in order to enable the respective error signal $ERR_i$.

In various embodiments, the error signals $ERR_1 \ldots ERR_n$ may thus again be provided to an error collector and optional internal reaction circuit 108'.

Figure 9:
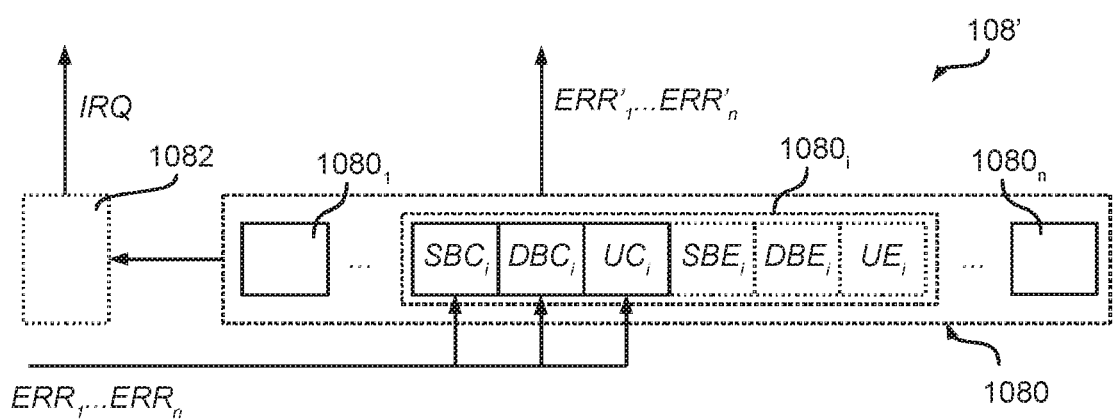

For example FIG. 9 shows a possible embodiment of a circuit 108' configured to handle a plurality of error signals $ERR_1 \ldots ERR_n$. For example, such a circuit 108' could also be used to handle plural error signals generated by plural memories.

Specifically, similar to the description of FIG. 6, the error handling circuit 108 includes a register 1080, such as a special function register of the processing unit 102, for storing the error signals $ERR_1 \ldots ERR_n$.

For example, as shown in FIG. 9, the register 1080 may include a plurality of sub-register $1080_1 \ldots 1080_n$, wherein each sub-register $1080_i$ includes a number of error bits for storing a respective error signal $ERR_i$. For example, in the exemplary embodiment, each sub-register $1080_i$ includes three bits $SBC_i$, $DBC_i$ and $UC_i$ for storing the respective bits of the respective error signal $ERR_i$. Thus generally, the register 1080 generates a plurality of error signals $ERR'_1 \ldots ERR'_n$ by storing the signals $ERR_1 \ldots ERR_n$. Again, each error signal ERR' may have also a different number of error bits and/or encoding scheme than the error signal ERR.

In various embodiments, the circuit 108' may also include an internal reaction circuit 1082 (such as an interrupt generator circuit) configured to generate one or more signals (such as an interrupt signal IRQ, a reset signal, etc.) as a function of the data stored in the sub-register $1080_i$. Similar to the description of FIG. 6, each sub-register $1080_i$ may thus also include one or more enable flags each enabling the generation an interrupt, a reset, etc. for a respective error code. For example, in the embodiment considered, each sub-register $1080_i$ includes three further bits $SBE_i$, $DBE_i$ and $UE_i$ for enabling the generation of the interrupt IRQ when the respective bit $SBC_i$, $DBC_i$ and $UC_i$ is set. For example, in the embodiment considered, the interrupt generator circuit 1082 may generate an interrupt when both a given error bit $SBC_i$, $DBC_i$ or $UC_i$ and the respective enable flag $SBE_i$, $DBE_i$ or $UE_i$ is set.

Figure 10:
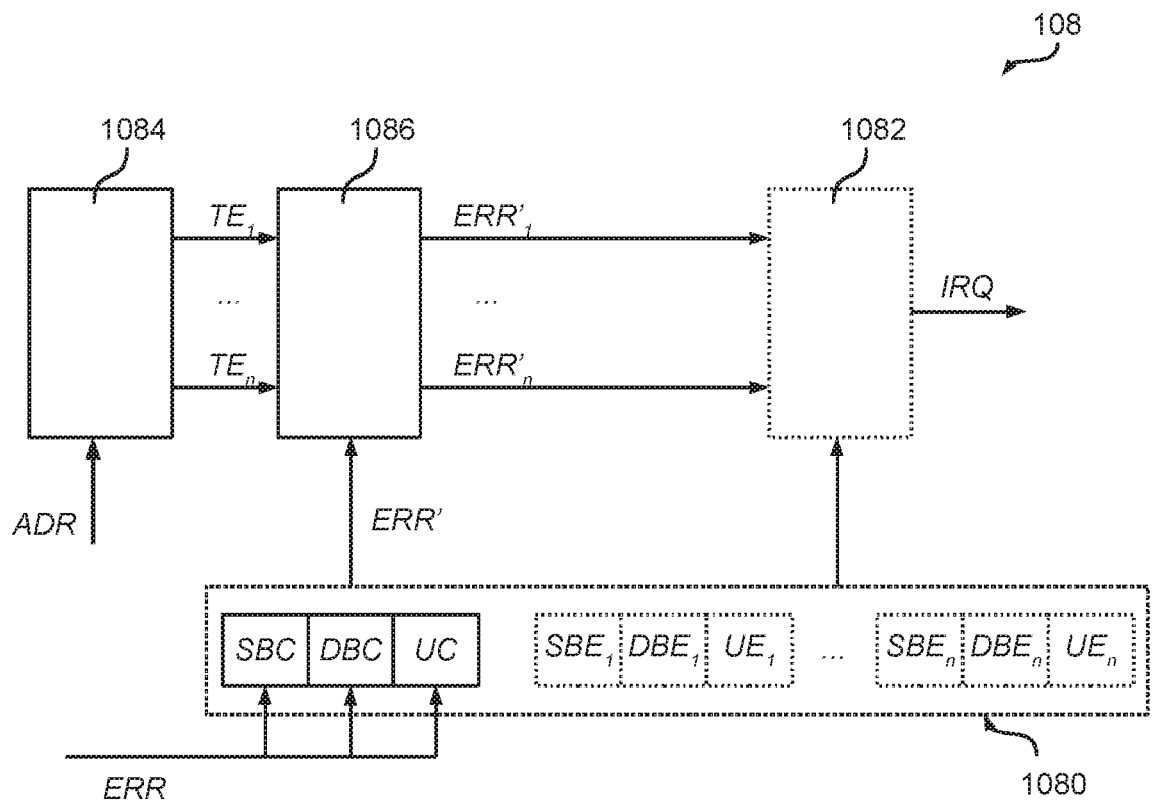
FIG. 10 shows a third embodiment of an error handling circuit.

FIG. 10 shows a further embodiment of the error handler circuit 108.

Specifically, instead of operating on the error signal ERR and storing the signals $ERR_i$ to the register 1080 (as described with respect to FIGS. 8 and 9), FIG. 10 shows an embodiment, wherein the combinational circuit 1086 operates already on the error signal ERR' stored in the register 1080 described with respect to FIG. 6. Specifically, in this case, the circuit 1086 described with respect to FIG. 8 receives at input the signal ERR' (and not the signal ERR).

In the embodiment considered, the output of the circuit 1086 providing error signals $ERR'_1 \ldots ERR'_n$ may thus be connected directly to the optional internal reaction circuit 1082. In this case, the register 1080 may still include the enable flag $SBE_i$, $DBE_i$ or $UE_i$ for the different error codes, which are then used by the internal reaction circuit 1082. In fact, generally, the blocks 1084 and 1086 may be arranged at any suitable position between the error processing circuit 210 of the memory 104 and the final module used to process the error signals $ERR'_1 \ldots ERR'_n$.

Figure 11:
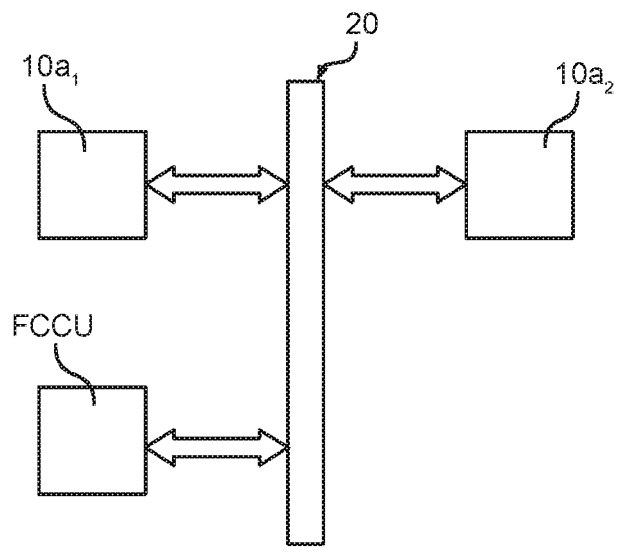
FIG. 11 shows an embodiment of an electronic system including a plurality of processing systems and a fault collection unit.

For example, also in this case the error signals $ERR'_1 \ldots ERR'_n$ and/or the interrupt signal(s) IRQ may be provided to the processing unit 102, another block 106 of the processing system 10a and/or a pin of the processing system 10a. For example, FIG. 11 shows an embodiment, wherein a plurality of processing systems 10a, such as two processing systems $10a_1$ and $10a_2$ are connected to a communication system 20. Generally, the architecture corresponds essentially to the architecture described with respect to FIG. 1 and the respective description applies also in this case. For example, the processing systems $10a_1$ may be an engine control unit and the processing systems $10a_2$ may be a transmission control unit.

However, in the embodiment considered, the system includes a further processing system FCCU connected to the common system 20. Specifically, the processing system FCCU is configured to implement a fault collection control unit. Accordingly, in this case, each processing system 10a may be configured to send the error signals $ERR'_1 \ldots ERR'_n$ also to the processing system FCCU. Generally, the transmission may be managed via the processing unit 102 of the processing system, or the error handling circuit 108 may provide directly the error signals $ERR'_1 \ldots ERR'_n$ and possibly the interrupt signal IRQ to a communication interface 106 of the processing system 10a (connected to the communication channel 10), which thus may transmit the error signals $ERR'_1 \ldots ERR'_n$ to the system FCCU without the intervention of the processing unit 102.

Accordingly, the solutions described permit that the memory 104 may be organized in different memory regions, such as a first (e.g. safety-critical) region identified by means of a first lower and upper address/limit $RL_1/RH_1$ and a second (e.g. non-safety critical) region identified by means of a second lower and upper address/limit $RL_2/RH_2$.

In the embodiment considered, the circuits 1084 and 1086 are configured to generate thus for the two regions respective two error signal $ERR_1$ and $ERR_2$ (or $ERR'_1$ and $ERR'_2$ in the embodiment shown in FIG. 10), wherein the first error signal $ERR_1$ is set to the currently provided error signal ERR (or ERR' in the embodiment shown in FIG. 10), when the address ADR belongs to the first range and the second error signal $ERR_2$ is set to the currently provided error signal ERR (or ERR' when the address ADR belongs to the second range.

Accordingly, generally, the processing unit 10a is configured to generate a plurality of error signals $ERR'_1$ and $ERR'_2$ based on the address ADR and these error signals $ERR'_1$ and $ERR'_2$ may be processed separately, thereby permitting a faster reaction time. For example, the interrupt generator circuit 1082 may be used to selectively generate an interrupt IRQ (or any other kind of trigger signal used to activate a given operation in response to a memory read error for a given memory range). For example, the interrupt handler 1082 may be configured via the respective enable flags (e.g. stored in the register 1080) 10: activate the interrupt IRQ already for a single bit error when the address belongs to the first region (e.g., $SBE_1$="1", $DBE_1$="1", $UE_1$="1"); and activate the interrupt IRQ only for an un-correctable error when the address belongs to the second region (e.g., $SBE_2$="0", $DBE_2$="0", $UE_2$="1").

Of course, without prejudice to the principle of the invention, the details of construction and the embodiments may vary widely with respect to what has been described and illustrated herein purely by way of example, without thereby departing from the scope of the present invention.

What is claimed is:

1. A processing system, comprising:
a processor programmed to generate at least one read request for reading data from a memory with error detection and/or correction, the read request comprising an address signal identifying an address of a given memory area in the memory;
an error handling circuit configured to be connected to the memory and to receive an error signal from the memory, wherein the error signal comprises an error code indicating whether the data read from the memory contains errors, wherein the error handling circuit comprises a hardware circuit configured to:
determine whether the address indicated by the address signal belongs to a first address range;
set an error code of a first error signal to the error code of the error signal when the address indicated by the address signal belongs to the first address range;
determine whether the address indicated by the address signal belongs to a second address range; and
set an error code of a second error signal to the error code of the error signal when the address indicated by the address signal belongs to the second address range; and
interrupt generator circuit configured to
generate one or more interrupt signals when the error code of the first error signal corresponds to one or more first reference values, and
generate the one or more interrupt signals when the error code of the second error signal corresponds to one or more second reference values.

2. The processing system according to claim 1, wherein the hardware circuit comprises a first combinational logic circuit configured to set a first enable signal to:
a first logic value when the address indicated by the address signal belongs to the first address range; and
a second logic value when the address indicated by the address signal does not belong to the first address range.

3. The processing system according to claim 2, wherein the hardware circuit further comprises a second combinational logic circuit configured to set a second enable signal to:
the first logic value when the address indicated by the address signal belongs to the second address range; and
the second logic value when the address indicated by the address signal does not belong to the second address range.

4. The processing system according to claim 3, wherein the hardware circuit further comprises a third combinational logic circuit configured to:
set the error code of the first error signal to the error code of the error signal when the first enable signal has the first logic value; and
set the error code of the second error signal to the error code of the error signal when the second enable signal has the first logic value.

5. The processing system according to claim 1, wherein at least one of the first address range or the second address range is programmable.

6. The processing system according to claim 1, wherein the error handling circuit comprises:
a register configured to store the error code of the error signal and to provide the error code to the hardware circuit for generating the first error signal and the second error signal.

7. The processing system according to claim 6, wherein the register is further configured to store the error code of the first error signal and the error code of the second error signal.

8. The processing system according to claim 1, wherein at least one of the one or more first reference values or the one or more second reference values is programmable.

9. The processing system according to claim 1, wherein at least one of the one or more interrupt signals, the first error signal or the second error signal is provided to the processor.

10. The processing system according to claim 1, wherein the processing system comprises a communication interface, and wherein at least one of the one or more interrupt signals, the first error signal or the second error signal is provided directly to the communication interface.

11. The processing system according to claim 1, wherein the processing system comprises a pin, and wherein at least one of the one or more interrupt signals, the first error signal or the second error signal is provided directly to the pin.

12. The processing system according to claim 1, wherein the error signal comprises a plurality of bits, and wherein the error code of the error signal indicates at least one of:
no error having occurred during a reading operation of the data;
an error having occurred during the reading operation of the data and that the error was corrected; or
an error having occurred during the reading operation of the data and that the error was not corrected.

13. The processing system according to claim 1, wherein the processor is a micro-processor configured to be programmed via software instructions.

14. The processing system according claim 1, further comprising the memory with error detection and/or correction.

15. The processing system according to claim 1, wherein the memory with error detection and/or correction comprises at least one of a non-volatile memory arranged to store firmware for the processor or a random-access memory arranged to store temporary results of processing by the processor.

16. The processing system according to claim 1, wherein the one or more interrupt signals comprise an interrupt, reset, or a signal to activate debug mode.

17. A method of operating a processing system, the method comprising:
storing data into a memory with error detection and/or correction;
generating, via a processing unit of the processing system, at least one read request for reading data from a given address of the memory with error detection and/or correction; and
generating, via an error handling circuit of the processing system, a first error signal and a second error signal as a function of the given address and an error signal received from the memory with error detection and/or correction;
determining, by the error handling circuit, whether the given address belongs to a first address range;
setting, by the error handling circuit, an error code of the first error signal to an error code of the error signal when the given address belongs to the first address range;
determining, by the error handling circuit, whether the given address belongs to a second address range;
setting, by the error handling circuit, an error code of the second error signal to the error code of the error signal when the given address belongs to the second address range;
generating one or more interrupt signals when the error code of the first error signal corresponds to one or more first reference values; and
generating the one or more interrupt signals when the error code of the second error signal corresponds to one or more second reference values.

18. The method according to claim 17, wherein at least one of the first address range or the second address range is programmable.

19. A processing system, comprising:
a processor programmed to generate at least one read request for reading data from a memory with error detection and/or correction, the read request comprising an address signal identifying an address of a given memory area in the memory;
an error handling circuit configured to be connected to the memory and to receive an error signal from the memory for the address, the error signal comprising an error code indicating whether the data read from the memory contains errors, the error handling circuit being configured to:
determine whether the address indicated by the address signal belongs to a first address range;
set an enable bit to first value in response to determining that the address indicated by the address signal belongs to the first address range; and
based on the enable bit having the first value and the error code of the error signal, generate a interrupt signal.

20. The processing system according to claim 19, wherein the error handling circuit is further configured to:
determine whether the address indicated by the address signal belongs to a second address range;
set the enable bit to a second value in response to determining that the address indicated by the address signal belongs to the second address range; and
based on the enable bit having the second value and the error code of the error signal, not generate a interrupt signal.

21. The processing system according to claim 19, wherein the interrupt signal comprises an interrupt, reset, or a signal to activate debug mode.

22. A method, comprising:
generating at least one read request for reading data from a memory with error detection and/or correction, the read request comprising an address signal identifying an address of a given memory area in the memory;

receiving, at an error handling circuit, an error signal from the memory for the address, the error signal comprising an error code indicating whether the data read from the memory contains errors;

determining whether the address indicated by the address signal belongs to a first address range;

setting an enable bit to first value in response to determining that the address indicated by the address signal belongs to the first address range; and based on the enable bit having the first value and the error code of the error signal, generating a interrupt signal.

23. The method according to claim 22, further comprising:

determining whether the address indicated by the address signal belongs to a second address range;

setting the enable bit to a second value in response to determining that the address indicated by the address signal belongs to the second address range; and based on the enable bit having the second value and the error code of the error signal, not generating a interrupt signal.

* * * * *